United States Patent Office 3,441,594
Patented Apr. 29, 1969

3,441,594
SUBSTITUTED HYDRAZINE COMPOUNDS
Roland Jaunin, Basel, and Paul Zeller, Allschwil, Switzerland, assignors to Hoffmann-La Roche Inc., Nutley, N.J., a corporation of New Jersey
No Drawing. Filed Feb. 10, 1966, Ser. No. 526,373
Claims priority, application Switzerland, Mar. 5, 1965, 3,127/65
Int. Cl. C07c 127/16, 125/06, 109/02
U.S. Cl. 260—471                6 Claims

ABSTRACT OF THE DISCLOSURE

Substituted hydrazines of the formula

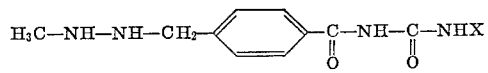

wherein X is hydroxy or lower alkoylcarbonyl, and intermediates are described. The end products demonstrate useful cytostatic activity.

---

The present invention is concerned with novel substituted hydrazine compounds of the formula

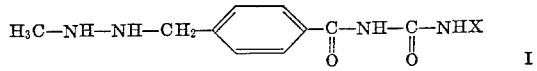  I in which X is hydroxy or lower alkoxycarbonyl, as well as salts of these compounds.

The lower alkoxycarbonyl group denoted by X can contain up to 7 carbon atoms. X preferably represents the ethoxycarbonyl or isopropoxycarbonyl group. Preferred representatives of this class of compound are, for example, 1-[p-(4-hydroxy-allophanoyl)-benzyl]-2-methyl-hydrazine,
1-[p-(4-ethoxycarbonyl-allophanoyl)-benzyl]-2-methyl-hydrazine,
1-[p-(4-isopropoxycarbonyl-allophanoyl)-benzyl]-2-methyl-hydrazine,
1-[p-(4-methoxycarbonyl-allophanoyl)-benzyl]-2-methyl-hydrazine.

In one embodiment, the compounds of Formula I can be manufactured by freeing a compound of the formula

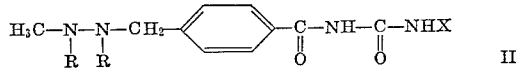  II in which X has the significance given above and R represents an aryl-lower alkoxycarbonyl residue, of the residue denoted by R.

Of the aryl-lower alkoxycarbonyl groups denoted by R, those in which the aryl residue is a phenyl residue are preferred. The term lower alkoxy includes hydrocarbonoxy moieties containing a lower alkyl group. The benzyloxycarbonyl group is particularly suitable as a protecting group.

The starting compounds of Formula II can be prepared as follows:

1,2 - bis - (arylalkoxycarbonyl)-1-(p-carboxy-benzyl)-2-methyl-hydrazine is converted into an acid halide and then treated with ammonia. The 1,2-bis-(arylalkoxycarbonyl)-1-(p-carbamoylbenzyl)-2-methyl-hydrazine obtained is then transformed by the action of oxalyl chloride into the corresponding isocyanate. The latter can be converted with hydroxylamine into 1,2-bis-(arylalkoxycarbonyl) - 1 - [p-(4-hydroxy-allophanoyl)-benzyl]-2-methyl-hydrazine or with a carbamic acid which is esterified by a lower alkanol into 1,2-bis-(arylalkoxycarbonyl) - 1 - [p-(4-alkoxycarbonyl-allophanoyl)-benzyl]-2-methyl-hydrazine.

The protecting groups R present in the compounds of Formula II can be split off in a manner known per se (e.g. by hydrogenolysis).

The hydrogenolysis is conveniently carried out with catalytically activated hydrogen. Palladium-carbon is preferably used as catalyst.

The substituted hydrazine compounds of Formula I form pharmaceutically acceptable salts with both medicinally acceptable inorganic and organic acids; for example, with hydrohalic acids such as hydrochloric acid, with other mineral acids such as sulfuric acid or phosphoric acid, as well as with organic acids such as tartaric acid, citric acid, oxalic acid, camphor-sulfonic acid, salicylic acid, ascorbic acid, maleic acid, mandelic acid, and the like. Preferred salts are the hydrohalides, especially the hydrochlorides. The acid addition salts are preferably manufactured in an inert solvent by treatment of the free base with the corresponding acid. Non-pharmaceutically acceptable acid addition salts can be converted into pharmaceutically acceptable acid addition salts by neutralization followed by reaction with a suitable medicinally acceptable acid.

The hydrazine compounds of Formula I, as well as pharmaceutically acceptable acid addition salts thereof, are useful as cytostatic agents. Thus, they inhibit the growth of transplantable tumors, e.g. Walker carcinoma, in mice and rats. In particular, 1-[p-(4-hydroxy-allophanoyl)-benzyl]-2-methyl-hydrazine and 1-[p-(4-ethoxycarbonyl-allophanoyl)-benzyl]-2-methyl-hydrazine are especially active against the Walker carcinoma of rats.

The hydrazine compounds of Formula I are accordingly pharmaceutically useful; for example, they can be administered internally in the form of conventional pharmaceutical preparations which contain the active materials or their pharmaceutically acceptable acid addition salts in admixture with a pharmaceutical organic or inorganic inert carrier which is suitable for enteral or parenteral application such as, for example, water, gelatin, gum arabic, lactose, starch, magnesium stearate, talc, vegetable oils, polyalkyleneglycols, Vaseline, and the like. The pharmaceutical preparations can be submitted in solid form (e.g. as tablets, dragees, suppositories, capsules) or in liquid form (e.g. as solutions, suspensions or emulsions). They may be sterilized and/or contain additive such as preserving, stabilizing, wetting or emulsifying agents, salts for varying the osmotic pressure, or buffers. They can also contain other therapeutically active materials.

The following examples are illustrative of the invention but not limitative thereof. All temperatures are stated in degrees centigrade.

EXAMPLE 1

21 g. of 1,2-bis-(benzyloxycarbonyl)-1-[p-(4-hydroxy-allophanoyl)-benzyl]-2-methyl-hydrazine is dissolved in 300 ml. of absolute methanol and, after the addition of 4 g. of 5% palladium/charcoal catalyst to the solution, the reaction mixture is shaken at atmospheric pressure and room temperature in a hydrogen atmosphere. The hydrogenation comes to a standstill after the uptake of 1.5 liters of hydrogen. The reaction mixture is then treated in a nitrogen atmosphere with a small excess of a 1 N methanolic hydrogen chloride solution and further stirred until the sediment has completely dissolved. The catalyst is then filtered off in a nitrogen atmosphere and the filtrate evaporated under reduced pressure at 40°. The residual 1-(p-[4-hydroxy-allophanoyl]-benzyl)-2-methyl-hydrazine hydrochloride melts at 167–168° after recrystallization from a mixture of methanol and ether.

The starting material employed above can be prepared as follows:

20 g. of 1,2-bis-(benzyloxycarbonyl)-1-(p-carbamoyl-benzyl)-2-methyl-hydrazine is dissolved in 100 ml. of ethylene chloride (which has been completely dried over calcium chloride). Subsequently, after the addition of 5 ml. of freshly distilled oxalyl chloride, the reaction solution is heated under reflux conditions for 12 to 14 hours, then evaporated under reduced pressure. The 1,2-bis-(benzyloxycarbonyl) - 1 - (p-isocyanato-benzyl) - 2 - methyl-hydrazine which separates out as an oil is taken up in 100 ml. of dry dimethylformamide.

7 g. of hydroxylamine hydrochloride is dissolved in 100 ml. of anhydrous dimethylformamide, and the solution treated with 14 ml. of anhydrous triethylamine, whereupon the triethylamine precipitates as the hydrochloride. The solution of the isocyanate prepared above is then introduced dropwise between 25 and 30° into this mixture. After the isocyanate addition is completed, the reaction mixture is stirred at room temperature for 3 hours and then poured into 1 liter of ice-water. After standing for 1 hour, the aqueous phase is separated and discarded. The pasty sediment is taken up in 1500 ml. of ether with an addition of 100 ml. of methylene chloride. The organic phase is subsequently washed with water until neutral, dried over anhydrous sodium sulfate and evaporated to dryness at 40° under reduced pressure. The residual oily, yellow 1,2-bis(benzyloxycarbonyl)-[p-(4-hydroxyallophanoyl)-benzyl]-2-methyl-hydrazine can be used without further purification.

EXAMPLE 2

24 g. of 1,2-bis(benzyloxycarbonyl)-1-[(p-4-ethoxycarbonyl-allophanoyl)-benzyl]-2-methyl-hydrazine in the form of a clear, slightly brown-coloured oil is dissolved in 300 ml. of absolute ethyl alcohol and, after the addition of 4 g. of 5% palladium/charcoal to the solution, the reaction mixture is hydrogenated at atmospheric pressure and room temperature. The hydrogenation comes to a standstill after the uptake of 0.5 to 0.6 liter of hydrogen. The reaction is then further hydrogenated after the further addition of 4 g. of 5% palladium/charcoal until altogether 1.4 to 1.5 liters of hydrogen are taken up. The catalyst is then filtered off in a nitrogen atmosphere. After the addition of a small excess of a 1 N ethanolic hydrogen chloride solution, the filtrate is diluted little by little with 800 ml. of absolute ether. 1-[p-(4-ethoxycarbonyl-allophanoyl)-benzyl]-2-methylhydrazine hydrochloride precipitates spontaneously in the form of a colourless crystalline powder. After the reaction mixture is left standing in the cold for ca. 1 hour, the compound is isolated with exclusion of air and washed with ca. 10 ml. absolute ether. It melts at 188 to 190° with decomposition.

The starting material employed above can be prepared as follows:

20 g. of 1,2-bis-(benzyloxycarbonyl)-1-(p-carboxybenzyl)-2-methyl-hydrazine is dissolved in 100 ml. of freshly distilled thionyl chloride, and the solution heated under reflux conditions for 1 hour. The excess thionyl chloride is then distilled off under reduced pressure at 40°. In order to completely remove the last fractions of thionyl chloride, the residue is dissolved in 60 ml. of absolute benzene. A stream of dry ammonia gas is then led into the cooled solution at a temperature between 0–5° until the solution is saturated and no more ammonium chloride precipitates. This is filtered off and washed with benzene. The combined benzene phases are then evaporated to dryness under reduced pressure at 40°. The residual oily, yellowish coloured 1,2-bis(benzyloxycarbonyl) - 1 - (p-carbamoyl-benzyl) - 2 - methylhydrazine is then dissolved in 100 ml. of ethylene chloride (which has been dehydrated over calcium chloride). The solution, after the addition of 5 ml. of freshly distilled oxalyl chloride, is heated under reflux conditions for 12 to 14 hours. After the addition of 5.2 g. of urethane to the cooled solution, the reaction mixture is stirred at room temperature for 15 minutes and subsequently again heated under reflux conditions for 30 hours. The cooled solution is then twice thoroughly shaken with 50 cc. of water, dried over anhydrous sodium sulfate and evaporated to dryness under reduced pressure at 40°. The residual 1,2-bis - (benzyloxycarbonyl) - 1 - [p-(4-ethoxycarbonyl-allophanoyl)-benzyl]-2-methyl-hydrazine (a clear, brownish coloured oil) can be further used without further purification.

EXAMPLE 3

1,2 - bis - (benzyloxycarbonyl) - 1 - [p - (4 - methoxycarbonyl-allophanoyl) - benzyl] - 2 - methyl - hydrazine is converted into 1-[p-(4-methoxycarbonyl-allophanoyl)-benzyl] - 2 - methyl-hydrazine hydrochloride of melting point 193-195° by the procedure of Example 2.

The starting material can be prepared according to the procedure by which the starting material in Example 2 is prepared, starting from 1,2-bis-(benzyloxycarbonyl)-1-(p-carboxybenzyl) - 2 - methyl - hydrazine and carbamic acid methyl ester.

EXAMPLE 4

1,2 - bis - (benzyloxycarbonyl) - 1 - [p - (4-isopropoxycarbonyl-allophanoyl)-benzyl]-2-methyl-hydrazine is converted into 1-[p-(4 - isopropoxycarbonyl - allophanoyl)-benzyl] - 2 - methyl-hydrazine hydrochloride of melting point 193-195° by the procedure of Example 2.

The starting material can be prepared according to the procedure by which the starting material in Example 2 is prepared, starting from 1,2-bis-(benzyloxycarbonyl)-1-(p-carboxybenzyl)-2-methyl-hydrazine and carbamic acid isopropyl ester.

EXAMPLE 5

Manufacture of capsules of the following composition:

| | mg. |
|---|---|
| 1 - [p - (ethoxycarbonyl - allophanoyl) - benzyl]-2-methyl-hydrazine hydrochloride | 10 |
| Mannitol | 110 |
| Talcum | 5 |
| | 125 |

The active material is homogeneously mixed with the talcum and mannitol, the mixture passed through a No. 5 sieve (mesh width about 0.23 mm.) and again thoroughly mixed. The so-obtained mixture is then filled into gelatin capsless No. 4.

We claim:
1. A compound selected from the group consisting of compounds of the formula

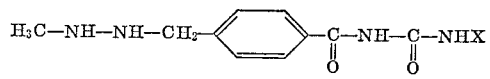

in which X is hydroxy or lower alkoxycarbonyl and pharmaceutically acceptable acid addition salts thereof.

2. 1-[p-(4-hydroxy - allophanoyl) - benzyl]-2-methyl-hydrazine.

3. 1-[p-(4-methoxy - carbonyl - allophanoyl)-benzyl]-2-methyl-hydrazine.

4. 1-[p-(4-ethoxy - carbonyl - allophanoyl)-benzyl]-2-methyl-hydrazine.

5. 1-[p - (4 - isopropoxy - carbonyl - allophanoyl)-benzyl]-2-methyl-hydrazine.

6. A compound of the formula

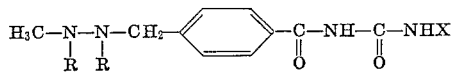

in which X is hydroxy or lower alkoxycarbonyl and each R is phenyl-lower alkoxycarbonyl.

References Cited

UNITED STATES PATENTS 3,272,839  9/1966  Bollag et al. _____ 260—304

LORRAINE A. WEINBERGER, *Primary Examiner.*

L. ARNOLD THAXTON, *Assistant Examiner.*

U.S. Cl. X.R.

260—500.5, 501.17; 424—300, 315